Figure 1:
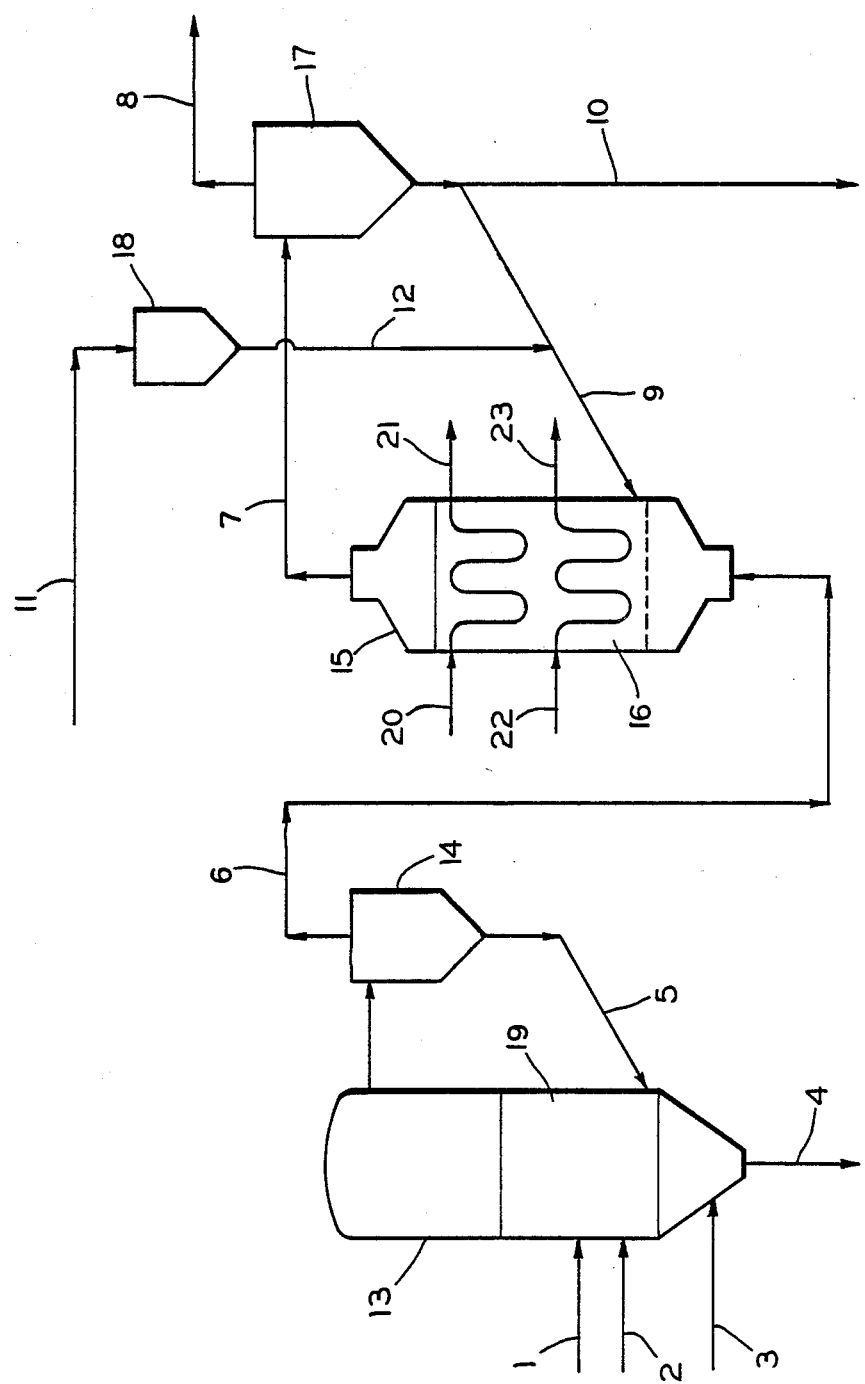

United States Patent [19]

Brandl et al.

[11] Patent Number: 4,936,872
[45] Date of Patent: Jun. 26, 1990

[54] PROCESS FOR COOLING RAW GAS OBTAINED FROM PARTIAL OXIDATION OF CARBON-CONTAINING MATERIAL

[76] Inventors: Adrian Brandl, Himpendahlweg 1, 4600 Dortmund 1; Natarajan Thiagarajan, Bomchestr. 25, 4600 Dortmund 1; Heinz-Georg Schuster, Ordensweg 41, Dortmund 12; Wolfgang Hillebrand, Westendorfstr. 6, 4600 Dortmund 41, all of Fed. Rep. of Germany

[21] Appl. No.: 222,580

[22] Filed: Jul. 21, 1988

[30] Foreign Application Priority Data

Jul. 28, 1987 [DE] Fed. Rep. of Germany ....... 3724947

[51] Int. Cl.⁵ .......................... C10K 1/02; C10K 1/08; C10K 1/20
[52] U.S. Cl. .................... 48/197 R; 48/210; 55/76; 55/80; 55/83; 55/99; 252/373
[58] Field of Search ............ 48/197 R, 202, 203, 48/206, 210; 252/373; 122/7 R; 55/80, 83, 76, 79, 99

[56] References Cited

U.S. PATENT DOCUMENTS

| | | | |
|---|---|---|---|
| 2,591,595 | 4/1952 | Ogorzaly | 48/210 |
| 3,976,446 | 8/1976 | Sims | 48/210 |
| 4,233,275 | 11/1980 | Kimura et al. | 48/210 |
| 4,412,848 | 11/1983 | Koyama et al. | 48/206 |
| 4,461,629 | 7/1984 | Arisaki | 48/210 |
| 4,613,344 | 9/1986 | Henrich et al. | 48/210 |

Primary Examiner—Peter Kratz
Attorney, Agent, or Firm—Marshall & Melhorn

[57] ABSTRACT

The process for cooling raw gas obtained from partial oxidation of carbon-containing material by way of the fluidized-bed method, the fixed-bed method or the entrained-bed method at temperatures above 700° C. and pressures ranging from 1 to 120 bar, the carbon-containing material being coal, peat or any other carbon-containing solid, while the oxidizing agent is oxygen, air, water and/or another oxygen-containing matter, to provide a solution to the problem of avoiding fouling and corrosion downstream heat exchangers. This aim is achieved in that raw gas is cooled direct to temperatures ranging from 100°–500° C. in a downstream fluidized-bed cooler using solid additives such as sand.

26 Claims, 4 Drawing Sheets

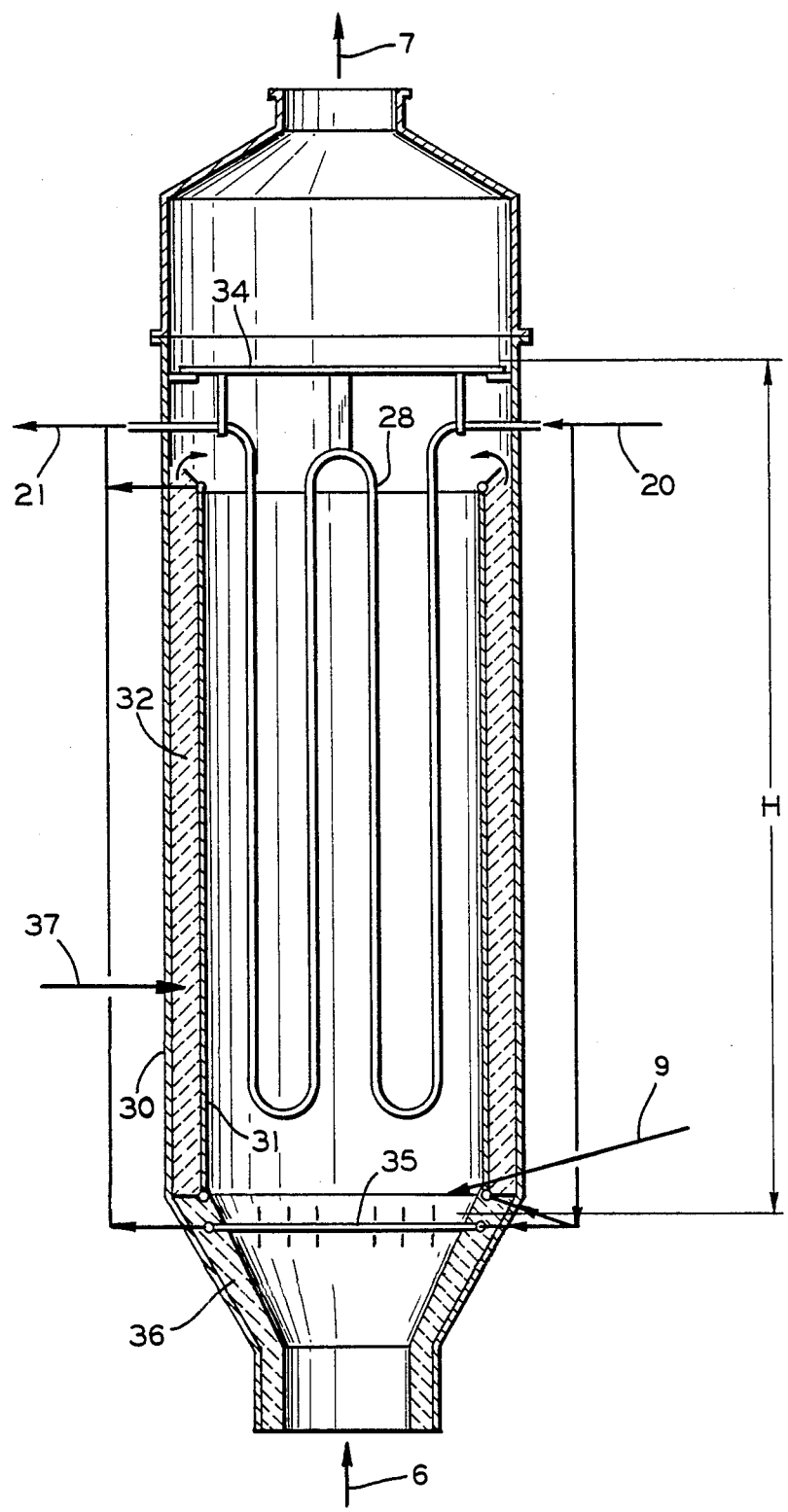
F.IG. 4

PROCESS FOR COOLING RAW GAS OBTAINED FROM PARTIAL OXIDATION OF CARBON-CONTAINING MATERIAL

BACKGROUND OF THE INVENTION

The invention relates to a process and a device for cooling raw gas obtained from partly oxidized carbon-containing material, which is made up of solids and/or desublimable vapors.

As is known, coal, peat, liquid and gaseous hydrocarbons and other carbon-containing materials can, by partial oxidation (i.e. gasification) using oxygen, air or oxygen-rich gases, be converted into a raw gas, a gas mixture containing, above all, carbon monoxide, hydrogen, carbon dioxide, steam and gaseous hydrocarbons. This gas mixture also contains non-reacted carbon, slag or ash, volatilized salts and other desublimable vapors such as heavy metal compounds: V, Ni, etc. Depending on the process applied, gasification takes place at temperatures ranging from 700° to 2000° C. and pressures ranging from 1 to 120 bar.

Traditional gasification processes are described in Winnacker-Kuchler Chemische Technology. 4th ed., vol 5, pp. 262-264 and pp. 420-438.

With traditional gasification processes, the raw gas obtained is cooled and purified. Several cooling methods are employed: Cooling the raw gas by indirect heat exchange in a gas cooler in order to generate steam or to heat other fluid streams, as well as direct cooling of the raw gas by means of quenching with water or return gas.

The indirect method of cooling raw gas, which is more valuable from an energetic point of view, is applied in various ways, depending on outlet temperature and gasified material.

In the case of entrained-bed coal gasification, with gas outlet temperatures above the ash melting point, a so-called radiation cooler is employed to cool both raw gas and slag to below the slag solidification temperature of 700° to 1000° C. The raw gas containing solids is cooled to 200°–400° C. in a so-called convection cooler. Both types of cooler tend to foul up considerably due to deposits of slag and desublimated vapors.

The entrained-bed gasification of hydrocarbons, especially of heavy liquid hydrocarbons, produces not only the above-mentioned raw gas components, but also soot and heavy metal compounds. the raw gas temperature is reduced in a cooler from 1200°–1400° C. down to 200°–400° C., the cooling surfaces being subjected to considerable fouling by soot. Moreover, separated heavy metal compounds caused corrosion of the cooling surfaces.

The fluidized-bed gasification of coal, peat or other materials containing carbon and ash produces a raw gas containing ashes and desublimable vapors. the raw gas, having an outlet temperature of 700°–1000° C. is cooled to 200°–400° C. in a cooler, which is subjected to considerable fouling as result of deposited and incrustated solids.

In the case of combustion. i.e. complete oxidation of carbon-containing materials like coal, peat, etc., raw-gas cooling (or flue-gas cooling) is effected by way of steam generation above the combustion chamber or, after partial separation of solids, in a downstream steam generator. Steam generators tend to foul up considerably in line with the rising salt content of the feedstock employed, with the result that waste heat recovery can no longer be effected if the salt content is too high.

As a rule. indirect processes for cooling raw gases are characterized by gradual fouling of cooling surfaces, resulting in plant failure and shutdown.

The well-known means used to reduce fouling such as soot-blowing, knocking, sonic impacting or providing extra-large heating surfaces produce little success. It is especially with fuels having a high salt content that the gas-cooling surfaces foul up and the gas channels are clogged rapidly.

The aim of the invention is to largely avoid the difficulties resulting from fouled-up cooling surfaces whenever raw gases must be cooled.

The aim of the invention is achieved by direct cooling of the raw gas to temperatures ranging from 100°–500° C. in a downstream fluidized-bed cooler using solid additives. Any liquid impurities contained in the raw gas must, prior to this process, be converted into solid matter.

Embodiments of the invention provide for the process to be varied in accordance with the sub-claims, in order to optimize, by way of novelty, the cooling of the raw gas depending on the fluid to be gasified as well as the oxidation temperature without excessive fouling up of the heat exchange surface.

The device for the implementation of this process is characterized in that the fluidized-bed cooler consists of a coil system enclosed by the fluidized bed. The coil system is fitted in a pressure vessel. Another feature is that the fluidized bed extends above a distributor mounted below the coil system, while the pressure vessel is protected by means of a cooled membrane wall and/or heat-resistant brick lining.

The solid additive may be an alien material such as sand, clay etc., or the ash or slag obtained in the process. Fluidized-bed cooling is effected outside the gasification chamber.

The fluidized-bed cooling of raw gas in line with the invention makes it possible for the solids contained in the fluidized bed to be subjected to a continuous and controlled self-purification process. In addition, the solid particles of the fluidized bed act as desublimation centers for salt vapors and other vapors contained in the raw gas. By means of partial withdrawal of the fluidized-bed solids, it is possible to remove the desublimation products from the gas chamber, thus reducing the burden on the downstream equipment. The fluidized-bed process of effecting direct cooling also makes it possible for the heat transfer process to be substantially improved as a result of the principally improved heat transfer offered by fluidized-bed cooling as opposed to gas convection processes, and as a result of the fact that heat-insulating fouling layers cannot form as a result of the indirect heat transfer from the fluidized bed to the cooling agent.

Another advantage is constituted by the additional dry-method separation of flue dust from the cooled raw gas in the return cyclone required for returning the fluidized-bed solids. The separation of flue dust thus reduces the burden on the downstream equipment.

Another advantage compared to traditional flue-pipe coolers is the fact that the cooling coils enclosed by the fluidized bed can be fitted in different temperature zones, thus generating steam at different pressures or, in addition to generating steam, heating purified gas obtained from the downstream parts of the device or superheating steam.

In coal-gasification processes, the flue dust separated from the raw gas is utilized as additional feedstock for the production of cement or material for road surfaces. Thus, another advantage of fluidized-bed cooling can be utilized in that feedstock for cement kilns or road construction is used as solid additive for the fluidized bed. Having been discharged together with the flue dust, the solid additives are used as feedstock either in the cement industry or in road building.

One embodiment of the invention provides for the raw gas obtained from fluidized-bed coal gasification to be cooled in a downstream fluidized-bed cooler, as shown in FIG. 1. High-pressure steam and low-pressure steam are generated in the fluidized-bed cooler.

The fluidized-bed cooler gasification reactor 13 is fed with coal 1. By means of steam 3 or oxygen or air 2, a fluidized bed of coal is obtained. The raw gas obtained is partly purified by separating ash particles and coal particles in cyclone 14. The discharged solids are returned to fluidized bed via line 5. Ash is removed from the gasification reactor via line 4. The partly purified raw gas is fed, at temperatures ranging from 700°–1000° C. into the fluidized-bed cooler 15 via line 6. The fluidized-bed cooler consists of a vessel with distributor, the fluidized bed layer 16 being arranged above said distributor, the latter enclosing cooling coils in which boiler feedwater is converted into steam via lines 20 and 22, i.e. into high-pressure steam of 40 to 180 bar via line 23, and into low-pressure steam of 2 to 10 bar via line 21, the fluidizing agent being the hot raw gas passing through the fluidized-bed cooler from bottom to top.

The raw gas is cooled to 200–250° C. Depending on the process employed, it may also be cooled to only 400° C., in which case the cooling coils required for the generation of low-pressure steam could be dispensed with.

The flue dust remains partly in the fluidized bed, partly it is entrained by the raw gas as it leaves the cooling zone. In accordance with the partial pressures required for equilibrium, salt vapors are desublimated on the solids of the fluidized bed. The cooled solid-laden raw gas is purified, i.e. the dust is removed in a cyclone 17 via line 7 in order to be piped to the downstream parts of the device via line 8. The solids discharged in the cyclone, which are partly laden with desublimation materials, are partly withdrawn via line 10, partly via line 9. The quantity of sand discharged is fed into the system from a feed vessel 18 via the fresh sand feed lines 11 and 12.

The solids discharged can be regenerated by separating the salts in an evaporation or washing process.

A slightly modified embodiment, which is particularly suitable for power station combines with integrated coal gasification, provides for the integration—between the high-pressure steam generator and the low-pressure steam generator—of a third raw-gas cooling system for superheating high-pressure steam or heating gas-turbine fuel gas.

Figure 2:
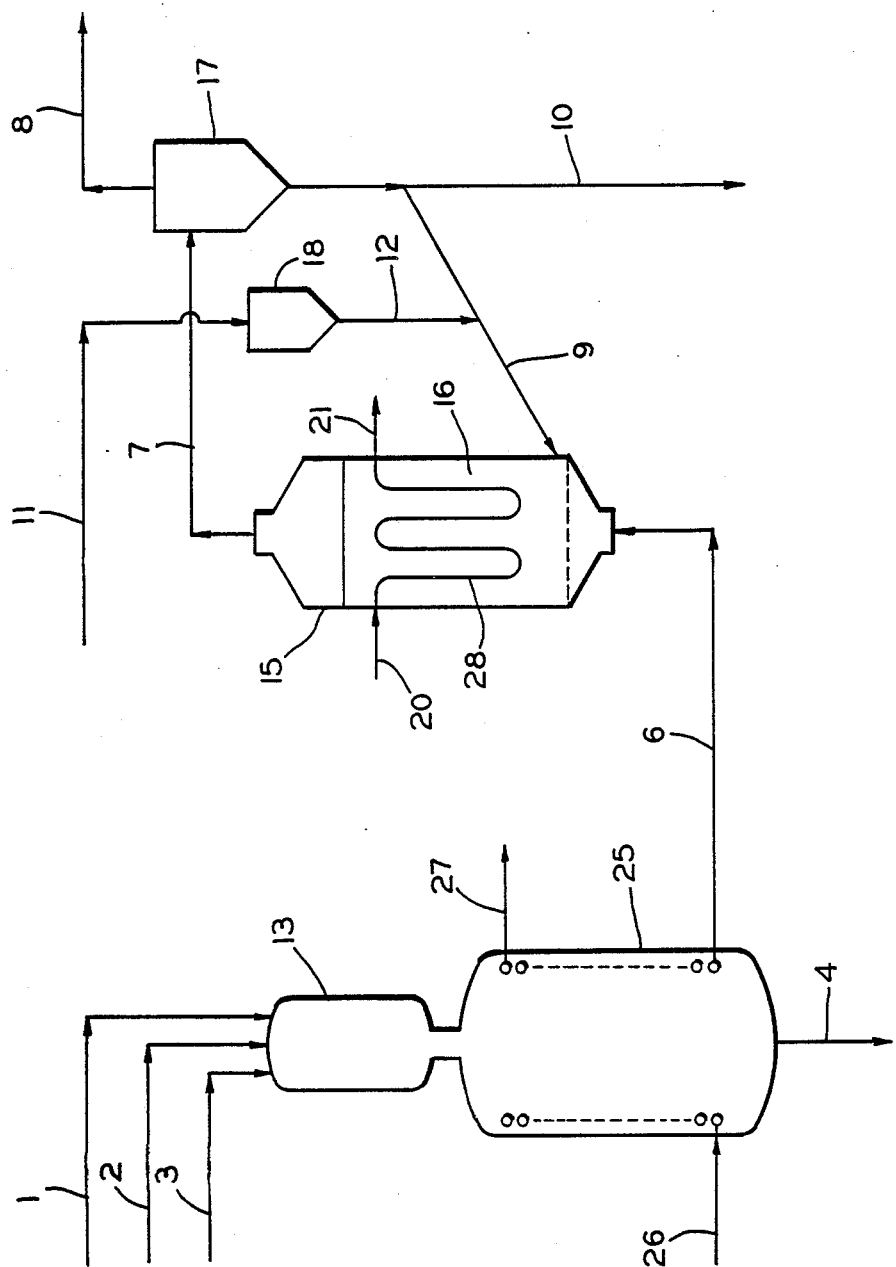

Another embodiment of the invention, as shown in FIG. 2, provides for the raw gas obtained from entrained-bed coal gasification or the gasification of hydrocarbons to be cooled to below 1000° C. in a radiation cooler in order to be cooled further to 200–400° C. in a fluidized-bed cooler. The entrained-bed gasification reactor 13 is fed with coal or hydrocarbons via line 1, oxygen or air via line 2 and steam or water via line 3, one variant allowing water and coal to be fed, as a suspension, via a joint conduit. The raw gas obtained at 1200–1500° C. is cooled in a radiation cooler 25 to below 1000° C., with simultaneous evaporation of boiler feedwater, via line 26, into high-pressure steam in line 27. Separated slag is discharged from the system via line 4. The raw gas, cooled to below 1000° C. is fed into a fluidized-bed cooler 15 via line 6, the cooler consisting of a pressure vessel and a system of coils 28. The fluidizing agent is the raw gas, which maintains a fluidizing layer 16 consisting of sand, clay or any other solids above the distributor. The raw gas is cooled to 200–400° C. in the fluidized-bed cooler in order to be fed to cyclone 17 via line 7. Entrained sand and slag or soot are separated in the cyclone. The purified and cooled raw gas is piped for further processing via line 8. The separated solids, which are laden with desublimation products, are partly removed from the system via line 10, partly returned via line 9. Fresh sand is fed to the system via lines 11 and 12 and via feed vessel 18. If sand and soot are to be withdrawn the latter can be separated from the sand by way of fluidized-bed classification or wet decanting in order to be recycled. As with the above-described embodiment of the invention, the cooling system can be utilized for the generation of high-pressure steam as well as for superheating of additional high-pressure steam, for heating of purified gas or for generating low-pressure steam.

Figure 3:
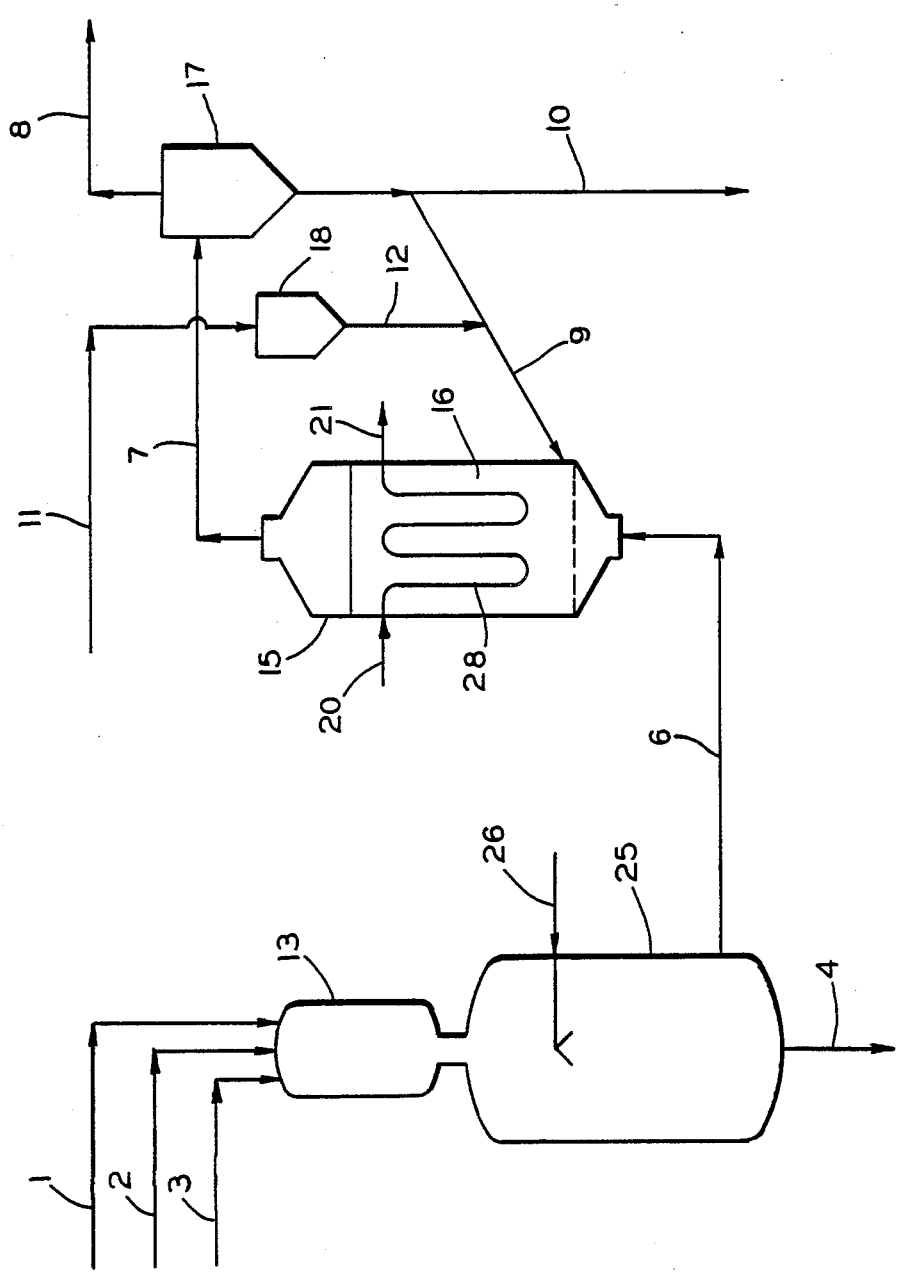

Another embodiment of the invention, as shown in FIG. 3, provides for the raw gas obtained from entrained-bed coal gasification or oil gasification to be cooled to below 1000° C. via spray quenching with water or quenching with recycled gas, in order to be cooled further to 200–400° C.

The entrained-bed gasification reactor 13 is fed with coal or hydrocarbons via line 1, with oxygen or air via line 2, and steam or water via line 3, a variant allowing water and coal to be fed, as a suspension, by way of a joint conduit. The raw gas obtained at 1200–1500° C. is cooled to below 1000° C. in a downstream quench vessel 25 by way of water spray quenching or recycled-gas quenching via line 26. With hydrocarbon gasification, this intermediary cooling process may even be dispensed with, if suitable solids with a high melting point are used in a downstream fluidized-bed cooler.

The raw gas, which has been cooled to below 1000° C., is subsequently cooled in the fluidized-bed cooler by the same process as in the case shown in FIG. 2.

One possible embodiment of the device which is central to the idea of the invention can be seen from FIG. 4.

The fluidized-bed cooler largely consists of a pressure vessel shell 30, a membrane wall 31 fitted on the membrane wall and a suspended coil system 28 in the space enclosed by the membrane wall.

The annular space between the membrane wall and the pressure vessel shell is provided with insulation 32 on the rear side and protected against the penetration of hot sulphurous gases with the aid of barrier gas 37 flowing at a low rate through this section.

The conical inlet chamber is lined with heat-resistant insulation 36.

In the cooler upper part, the coil system is supported by a suitable suspension system 34. It can be fitted and removed from above. Both the membrane wall and the coil system operate as forced-circulation evaporators.

The fluidized bed built up with the help of solids on the inside of the membrane wall, with an approximate fluidized-bed height H, ensures both good cleansing of the heating surfaces and a good gas-side heat transfer.

The solids discharged from the cooler are recycled, with some of the salt-laden solids or sand being discharged from the cyclone and replaced by fresh solids.

The design allows both for the coils to be passed by various cooling agents and for several sets of coils with various cooling agents to be fitted at different levels of the fluidized bed. Thus it is possible for steam to be generated at various pressures or for steam to be superheated, as well as for purified gas to be heated in the same fluidized-bed cooler.

In FIG. 4, there is shown a fluidized bed—raw gas boiler having the following parts:
- 30. Pressure vessel shell
- 31. Membrane wall
- 32. Rear-side insulation
- 28. Coils
- 34. Suspension for coils
- 35. Distributor grid
- 36. Heat-resistant insulation The highly efficient process of cooling a raw gas is preferably conducted at about 150° C. to 300° C. and optimumly more preferably, at about 200° C. to 250° C. In conjunction with the above cooling temperature, generally finely divided particles of sand or other inert, solid, heat transferring additive are used in a mesh size of about 5 mesh to 300 mesh. Preferably the size of the solid additive particles are about 10 to 200 mesh, with sand particles of about 20 mesh to 150 mesh being preferred.

The amount of solid additive added to the cooling raw gas is generally about ¼ lb. to 50 lbs. and preferably about ½ lb. to 5 or 10 lbs. per 1000 cubic feet (standard conditions—62° F.; 14.7 lbs. per sq inch) of raw gas.

What is claimed is:

1. A process for treating a raw gas stream originating from the gasification or combustion of a carbonaceous material, to prepare a cooled gas stream, comprising the steps of:
   (A) providing a bed of solid particles, to be fluidized by the passage therethrough of the raw gas stream;
   (B) providing heat transfer means within the bed of solid particles, for extracting heat from the solid particles;
   (C) continuously cooling the raw gas stream to a temperature below the slag solidification temperature, to solidify slag within the raw gas stream;
   (D) continuously separating the solidified slag from the raw gas stream;
   (E) continuously passing the raw gas stream having the solidified slag removed therefrom through the bed of solid particles, in such a manner so as to fluidize the bed of solid particles;
   (F) continuously cooling the raw gas stream having the solidified slag removed therefrom, by the transfer of heat from the raw gas to the solid particles, to prepare a cooled gas steam having a temperature from about 100° C. to about 500° C.; and
   (G) continuously cooling the solid particles, by the transfer of heat from the solid particles to the heat transfer means.

2. The process for treating a raw gas stream, according to claim 1, wherein the raw gas has a temperature from about 700° C. to about 1,200° C., and a pressure from about 1 to about 129 bar.

3. The process for treating a raw gas stream, according to claim 1, wherein the raw gas contains ash below its melting point, has a temperature from about 900° C. to about 1,500° C., and has a pressure from about 1 to 120 barr.

4. The process for treating a raw gas stream according to claim 1, wherein the temperature below the slag solidification temperature is less than about 1,000° C.

5. The process for treating a raw gas stream, according to claim 1, wherein the solid particles are selected from the group consisting of sand, clay, ash, and slag.

6. The process for treating a raw gas stream, according to claim 1, wherein the solid particles are sand.

7. The process for treating a raw gas steam, according to claim 1, wherein the solid particles have a grain size from about 5 to about 300 mesh.

8. The process for treating a raw gas stream, according to claim 11, wherein the solid particles have a grain size from about 10 to about 200 mesh.

9. The process for treating a raw gas stream, according to claim 6, wherein the sand particles have a grain size from about 20 to about 150 mesh.

10. The process for treating a raw gas stream, according to claim 1, wherein the raw gas in passed through the bed of solid particles at a rate from about 0.1 to about 4 meters per second.

11. The process for treating a raw gas stream, according to claim 1, wherein the raw gas is passed through the bed of solid particles at a rate from about 0.5 to about 1 meter per second.

12. The process for treating a raw gas stream, according to claim 1, including the step of controlling the temperature of the cooled gas stream so as to continuously remove desublimation products from the raw gas stream.

13. The process for treating a raw gas stream, according to claim 1, including the step of continuously passing the cooled gas stream through a cyclone, to remove solids therefrom.

14. The process for treating a raw gas stream, according to claim 1, wherein the heat transfer means includes at least one pipe disposed within the bed of solid particles, the pipe having a heat transfer fluid flowing therethrough.

15. The process for treating a raw gas stream, according to claim 14, wherein the heat transfer fluid is water or steam.

16. The process for treating a raw gas stream, according to claim 14, wherein the heat transfer means includes a plurality of pipes disposed within the bed of solid particles, so as to provide a plurality of cooling zones superposed in the direction of the raw gas movement through the bed.

17. The process for treating a raw gas stream, according to claim 1, including the step of continuously removing a portion of the solid particles from the bed of solid particles.

18. The process for treating a raw gas stream, according to claim 1, including the step of continuously adding solid particles to the bed of solid particles.

19. The process for treating a raw gas stream, according to claim 18, wherein the addition rate is from about 0.25 to about 50 pounds of solid particles per 1,000 standard cubic feet of raw gas treated.

20. The process for treating a raw gas stream, according to claim 19, wherein the addition rate is from about 0.5 to about 10 pounds of solid particles per 1,000 standard cubic feet of raw gas treated.

21. The process for treating a raw gas stream, according to claim 1, wherein the cooled gas stream has a temperature from about 200° C. to about 250° C.

22. The process for treating a raw gas stream according to claim 1, wherein the step of continuously cooling the raw gas stream to a temperature below the slag solidification temperature is accomplished by radiant cooling.

23. The process for treating a raw gas stream according to claim 1, wherein the step of continuously cooling the raw gas stream to a temperature below the slag solidification temperature is accomplished by fluid quenching.

24. A process for treating a raw gas stream originating from the gasification of coal, to prepare a cooled gas stream, comprising the steps of:

(A) providing a bed of solid particles, to be fluidized by the passage therethrough of the raw gas stream;

(B) providing heat transfer mans within the bed of solid particles, for extracting heat from the solid particles;

(C) continuously cooling the raw gas stream to a temperature below the slag solidification temperature, to solidify slag from the raw gas stream;

(D) continuously separating the solidified slag from the raw gas stream;

(E) continuously passing the raw gas stream having the solidified slag removed therefrom through the bed of solid particles, in such a manner so as to fluidize the bed of solid particles;

(F) continuously cooling the raw gas stream having the solidified slag removed therefrom, and controlling the temperature of the cooled gas stream so as to remove desublimation products therefrom, by the transfer of heat from the raw gas to the solid particles, to prepare a cooled, treated gas stream having a temperature from about 100° C. to about 500° C.; and (G) continuously cooling the solid particles, by the transfer of heat from the solid particles to the heat transfer means.

25. The process for treating a raw gas stream according to claim 24, wherein the step of continuously cooling the raw gas stream to a temperature below the slag solidification temperature is accomplished by radiant cooling.

26. The process for treating a raw gas stream according to claim 24, wherein the step of continuously cooling the raw gas stream to a temperature below the slag solidification temperature is accomplished by fluid quenching.

* * * * *